(12) United States Patent
Sellers et al.

(10) Patent No.: US 12,530,716 B2
(45) Date of Patent: Jan. 20, 2026

(54) SYSTEMS AND METHODS FOR COMBINED PROCESSING OF DISPARATE RESOURCE TYPES

(71) Applicant: BANK OF AMERICA CORPORATION, Charlotte, NC (US)

(72) Inventors: John Allen Sellers, Kennett Square, PA (US); Milton Antonio Jackson, Bethany, CT (US); Amber J. Grant, Beacon, NY (US); Kelly Baker, Franklin, MA (US); Kriscinda M. Hefney, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 18/611,382

(22) Filed: Mar. 20, 2024

(65) Prior Publication Data
US 2024/0320734 A1 Sep. 26, 2024

Related U.S. Application Data

(60) Provisional application No. 63/453,315, filed on Mar. 20, 2023.

(51) Int. Cl.
*G06Q 40/02* (2023.01)
(52) U.S. Cl.
CPC .................................. *G06Q 40/02* (2013.01)
(58) Field of Classification Search
CPC ....................................................... G06Q 40/02
USPC ..................................................... 705/35, 1.1
See application file for complete search history.

(56) References Cited

U.S. PATENT DOCUMENTS

| | | | |
|---|---|---|---|
| 6,625,709 B2 | 9/2003 | Aiken | |
| 7,747,457 B2 | 6/2010 | Cullen, III | |
| 8,204,820 B2 | 6/2012 | Cullen, III | |
| 8,861,395 B2 | 10/2014 | Tompson | |
| 9,497,136 B1 | 11/2016 | Ramarao | |
| 10,289,453 B1 | 5/2019 | Wei | |
| 10,332,072 B2 | 6/2019 | Feely | |
| 10,833,940 B2 | 11/2020 | Cencini | |
| 10,878,440 B1 * | 12/2020 | Bermudez | G06Q 20/381 |
| 10,924,363 B2 | 2/2021 | Pan | |
| 11,673,047 B2 | 6/2023 | Jarrett | |
| 2003/0187865 A1 | 10/2003 | Frisina | |

(Continued)

*Primary Examiner* — William E Rankins
(74) *Attorney, Agent, or Firm* — Moore & Van Allen PLLC; Nicholas C. Russell (57) ABSTRACT

Systems, computer program products, and methods are described herein for combined processing of disparate resource types. The present disclosure is configured to receive user resource account data for one or more disparate accounts; generate a consolidated resource accrual account for the one or more disparate accounts; calculate a conversion rate of resource denominations for each of the one or more disparate accounts to a common resource point value; generate a total resource point value for the one or more disparate accounts; transmit instructions to user device to display an account landing page including the total resource point value; update the account landing page based on additional user resource account data; organize user resource account data and additional user resource account data based on disparate account source; and display an itemized resource point value breakdown via the account landing page.

20 Claims, 5 Drawing Sheets

(56) References Cited

U.S. PATENT DOCUMENTS

| | | |
|---|---|---|
| 2003/0220944 A1 | 11/2003 | Lyman Schottland |
| 2003/0236854 A1 | 12/2003 | Rom |
| 2006/0190391 A1 | 8/2006 | Cullen |
| 2012/0173427 A1* | 7/2012 | Sparks .................. G07F 7/1025 705/44 |
| 2014/0229223 A1 | 8/2014 | Shakil |
| 2014/0282520 A1 | 9/2014 | Sabharwal |
| 2014/0310243 A1 | 10/2014 | McGee |
| 2017/0302586 A1 | 10/2017 | Suchter |
| 2020/0184557 A1 | 6/2020 | Wang |
| 2022/0121455 A1 | 4/2022 | Hoban |
| 2023/0005011 A1* | 1/2023 | Hennessy .......... G06Q 30/0229 |
| 2024/0223371 A1 | 7/2024 | Narayanan |

* cited by examiner

SYSTEMS AND METHODS FOR COMBINED PROCESSING OF DISPARATE RESOURCE TYPES

CROSS-REFERENCE TO RELATED APPLICATIONS

This application is a non-provisional application of and claims priority to U.S. Provisional Application No. 63/453,315, filed on Mar. 20, 2023, the contents of which are also incorporated herein by reference.

TECHNOLOGICAL FIELD

Example embodiments of the present disclosure relate to systems and methods for combined processing of disparate resource types.

BACKGROUND

Conventional systems and methods for resource processing often require users to interact with multiple interfaces in order to access and use resource types of different denominations or from different sources. This complexity ultimately leads to limited use of these resources and limited applications for redeeming resources for use at various merchants or for different products. As such, Applicant has identified a number of deficiencies and problems associated with systems and methods for combined processing of disparate resource types. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for combined processing of disparate resource types. As a solution to the shortcomings of conventional systems, the present invention includes a system designed for managing and deploying resources of disparate types, sources, or denominations in a single approachable user interface. The present invention also includes a number of approaches to increasing user engagement with the provided platform that are centered around the idea of positive engagement feedback.

Positive engagement feedback can be tailored to each specific user of the present invention in order to increase a likelihood of re-engagement with the platform. For instance, positive engagement feedback may include animations, tactile device feedback, auditory reactions, or the like, in response to certain user actions when interacting with the provided platform. Visual depictions, tactile haptic feedback, or auditory experiences may be generated by the system for transmission via a user device. The visual depictions, tactile haptic feedback, or auditory experiences may be designed to be pleasing to the user in response to certain user actions that the invention is meant to encourage, such as completing a goal, setting a new goal, activating a resource offer, managing a resource account, or the like.

Additionally, the invention may include a centralized dashboard, landing page, or other user interface that is designed to provide a summary of resources across multiple resource programs. For instance, a user may earn resources from one or more merchants, institutions, or the like, and may wish to visualize a tally of all resources from multiple merchants or institutions in a single place. Furthermore, the user may wish to combine the resources, or have them combined automatically, such that the value of the combined resources is easily understood. In some embodiments, this may include combining points or resources earned or accrued from one or more merchants or institutions into a single denomination of resources and displaying the single denominations of resources as a comparison to certain redemption options (e.g., dollar amounts, gift card amounts, airline miles, or the like). In this way, the user is provided the ability to accumulate resources across multiple different programs and access the collective sum of their accumulated resources in a single location, regardless of where the resources were earned, thereby simplifying the user experience and providing a more pleasing interaction overall designed to encourage re-engagement with the provided platform.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/ rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

As used herein, a "consolidated resource accrual account" refers to a digital account or ledger within a system that aggregates, combines, and manages resources accrued from multiple, distinct accounts controlled by different entities or sources. This consolidated account facilitates unified access, management, and utilization of these resources, providing a comprehensive overview of the user's total resources across various platforms or programs. The consolidation process involves the system's capability to integrate and harmonize disparate types of resources, whether they are points, miles, currency, or other forms of rewards, into a singular account framework for simplified user interaction and enhanced strategic resource planning.

As used herein, the "resource denomination conversion rate" signifies a predetermined or dynamically calculated ratio utilized by the system to convert various types of resources, such as loyalty points, miles, or currencies, from their original denominations in disparate accounts into a unified resource metric. This conversion rate enables the system to standardize and equate diverse resource types for aggregation and comparison purposes, simplifying the process of resource management and redemption by the user. It is understood that this rate may be established based on market values, agreements with resource providers, or proprietary algorithms that assess the value of different resource types in real-world terms or system-specific valuation frameworks.

As used herein, "total resource point value" denotes an aggregate valuation of a user's resources across multiple disparate accounts after conversion into a common denomination, as calculated by the system. This cumulative metric reflects the sum total of all resources available to the user within a consolidated resource accrual account, providing a unified view of the user's resources. The total resource point value serves as a critical measure for users to assess their overall resource holdings, make informed decisions regarding resource utilization, and plan for future accruals and redemptions.

As used herein, "user resource account data" encompasses all information pertaining to the resources held in an individual's accounts across various platforms or entities. This data includes, but is not limited to, the types and amounts of resources, the sources from which they were accrued, transaction histories, and any associated user actions that led to the accrual of such resources. User resource account data is critical for the system to perform functions such as resource aggregation, conversion, and display of the total resource point value, thereby enabling personalized and efficient resource management for the user.

As used herein, "dynamic user-specific rewards" refer to customized acknowledgments, benefits, or opportunities crafted and displayed by the system to individual users, taking into account their historical interactions, preferences, or patterns of engagement with the system. These rewards are designed to enrich the user experience and stimulate ongoing interaction with the platform. Such rewards may encompass exclusive deals, enhanced accrual periods, and tailor-made suggestions for maximizing resource utilization. The dynamic aspect of these rewards underscores their real-time customization, utilizing data analytics to adjust to evolving user behavior and preferences.

In the realm of digital innovation, the transformation of complex data into actionable, user-friendly interfaces marks a leap towards enhancing user engagement and operational efficiency. This invention represents a sophisticated convergence of technology and user-centric design, akin to advancements that have reshaped how digital platforms interact with their users. It intricately navigates the complexities of integrating diverse resource types from multiple sources, presenting a unified and intuitive user experience.

By harnessing the power of advanced programming languages and algorithms, the invention streamlines the process of collecting and consolidating resource data from a myriad of accounts managed by distinct entities. Through the application of API (Application Programming Interface) calls crafted in languages such as Python or Java, the system adeptly fetches and standardizes data, utilizing formats like JSON (JavaScript Object Notation) or XML (extensible Markup Language) for optimal data interchange and consistency. This meticulous approach to data harmonization not only ensures the seamless aggregation of resource information but also sets the stage for the dynamic customization of user interactions based on comprehensive data analytics.

The integration of machine learning models, employing libraries from Python's scikit-learn or TensorFlow, enables the invention to intelligently predict and apply conversion rates, thereby crafting a tailored resource valuation that resonates with the user's specific context. Furthermore, the deployment of real-time data processing frameworks like Apache Kafka ensures that user interfaces reflect the most current data, enhancing the relevance and immediacy of the information presented.

As users engage with the platform, they are greeted with a richly featured account landing page, thoughtfully designed to display a consolidated view of their resources. This dynamic presentation layer, developed using cutting-edge web technologies and frameworks, not only showcases the aggregated resource value but also enriches the user experience with interactive elements such as animations and auditory feedback, facilitated by JavaScript libraries and the Web Audio API. The real-time update capability, powered by WebSocket technology, guarantees that the landing page remains an interface that accurately mirrors the user's evolving resource landscape.

This inventive approach not only democratizes access to information by breaking down data silos but also elevates the user experience by providing a clear, actionable overview of accrued resources. By leveraging sophisticated database solutions like MySQL (an open-source relational database management system) or MongoDB (a NoSQL database program), the system ensures robust data management and scalability, paving the way for the efficient handling of vast data volumes and complex processing tasks. This technological foundation underpins the invention's ability to offer a seamless, engaging platform for users to manage and optimize their resources effectively.

Figure 1A:
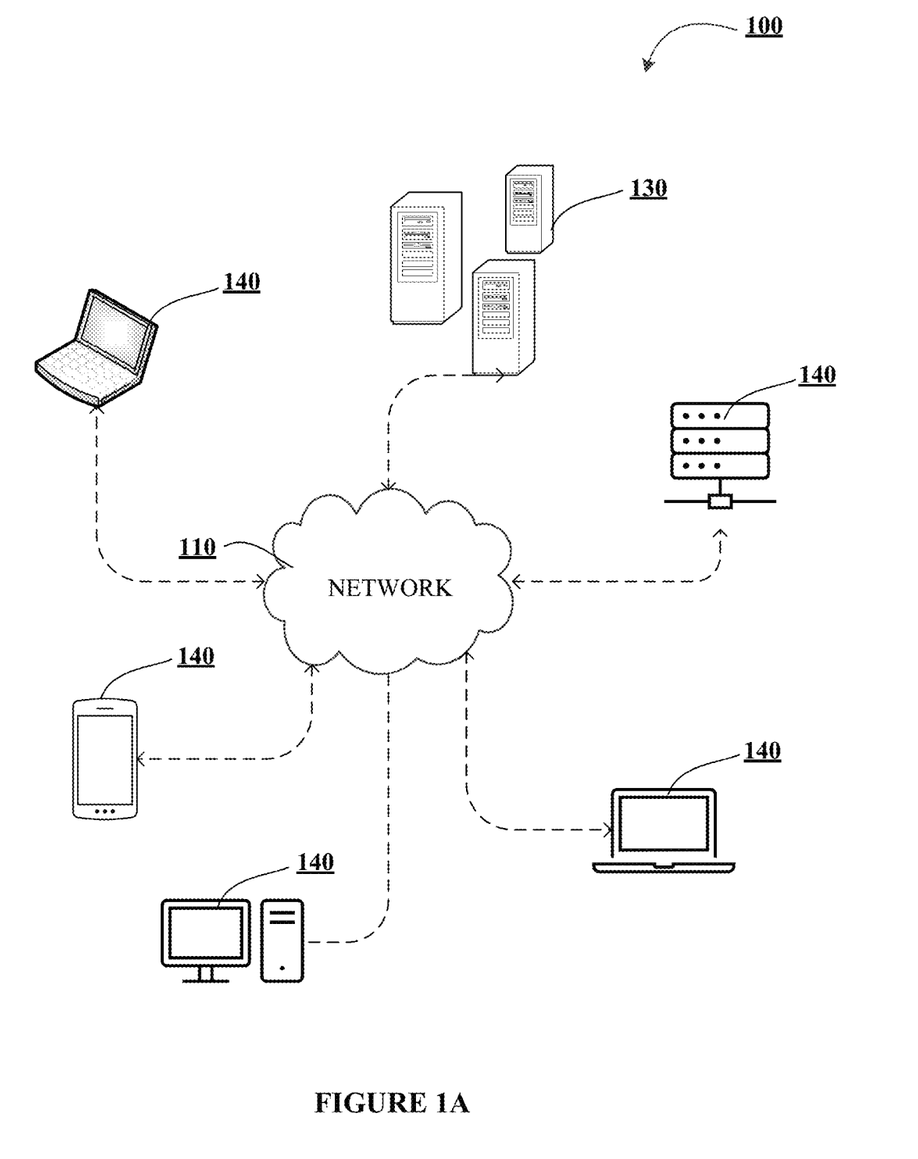
FIGS. 1A-1C illustrates technical components of an exemplary distributed computing environment for systems and methods for combined processing of disparate resource types, in accordance with an embodiment of the disclosure.
Figure 1B:
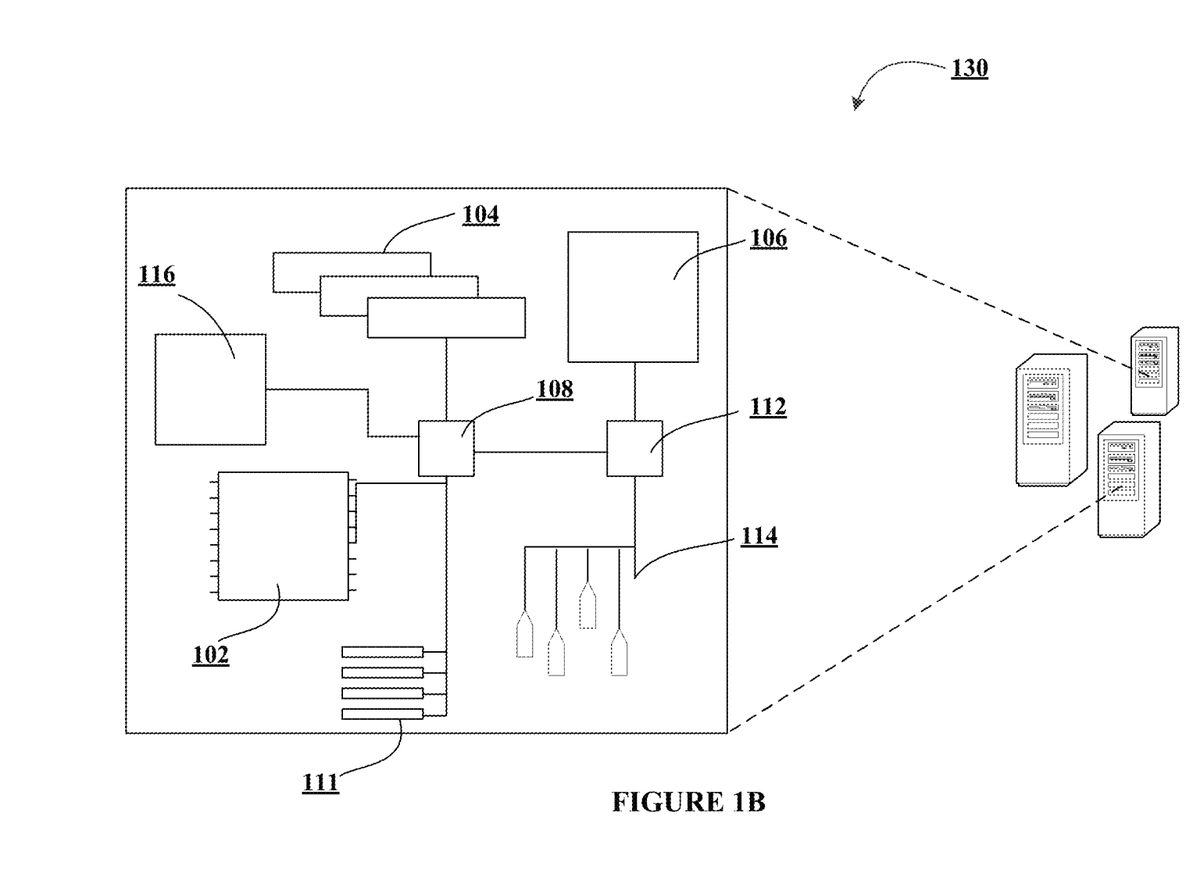
Figure 1C:
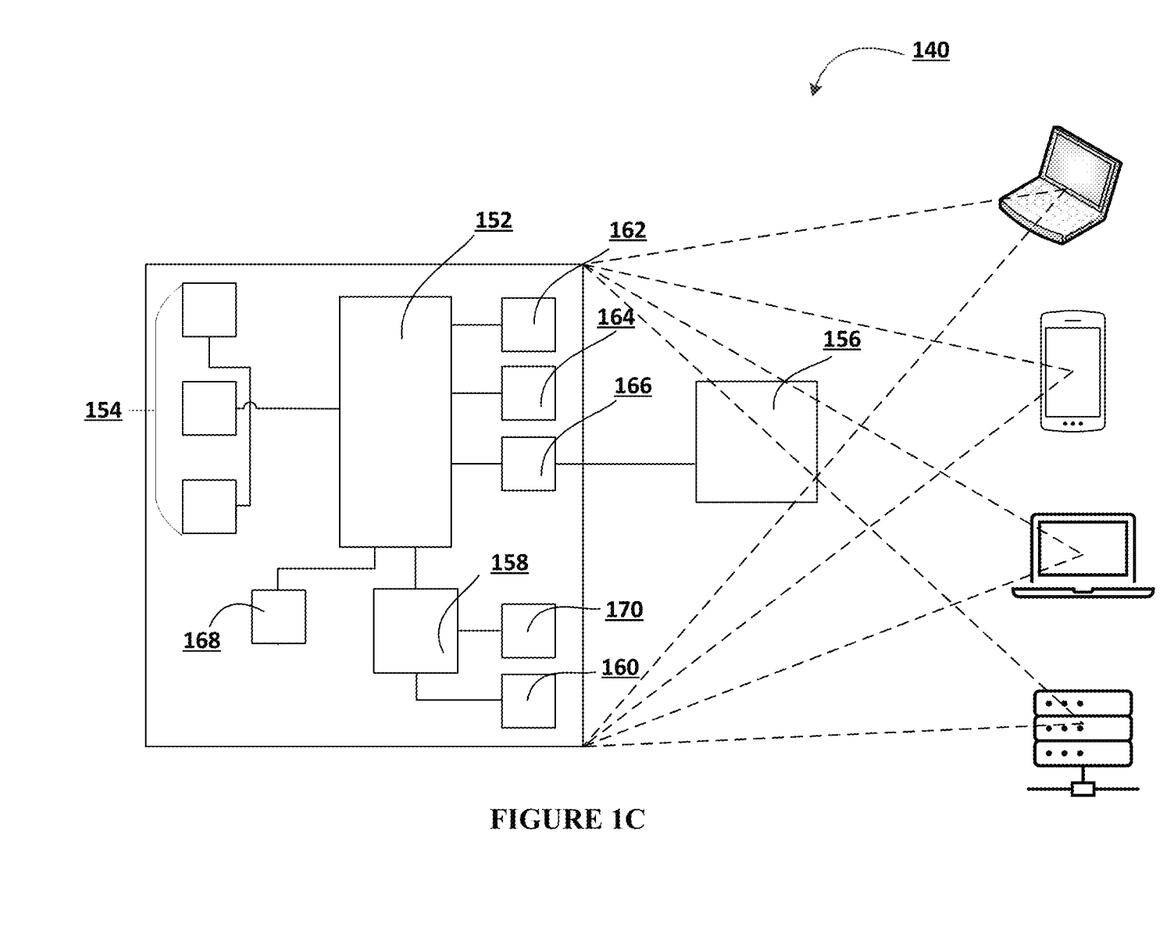

FIGS. 1A-1C illustrate technical components of an exemplary distributed computing environment 100 for systems and methods for combined processing of disparate resource types, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

Figure 2:
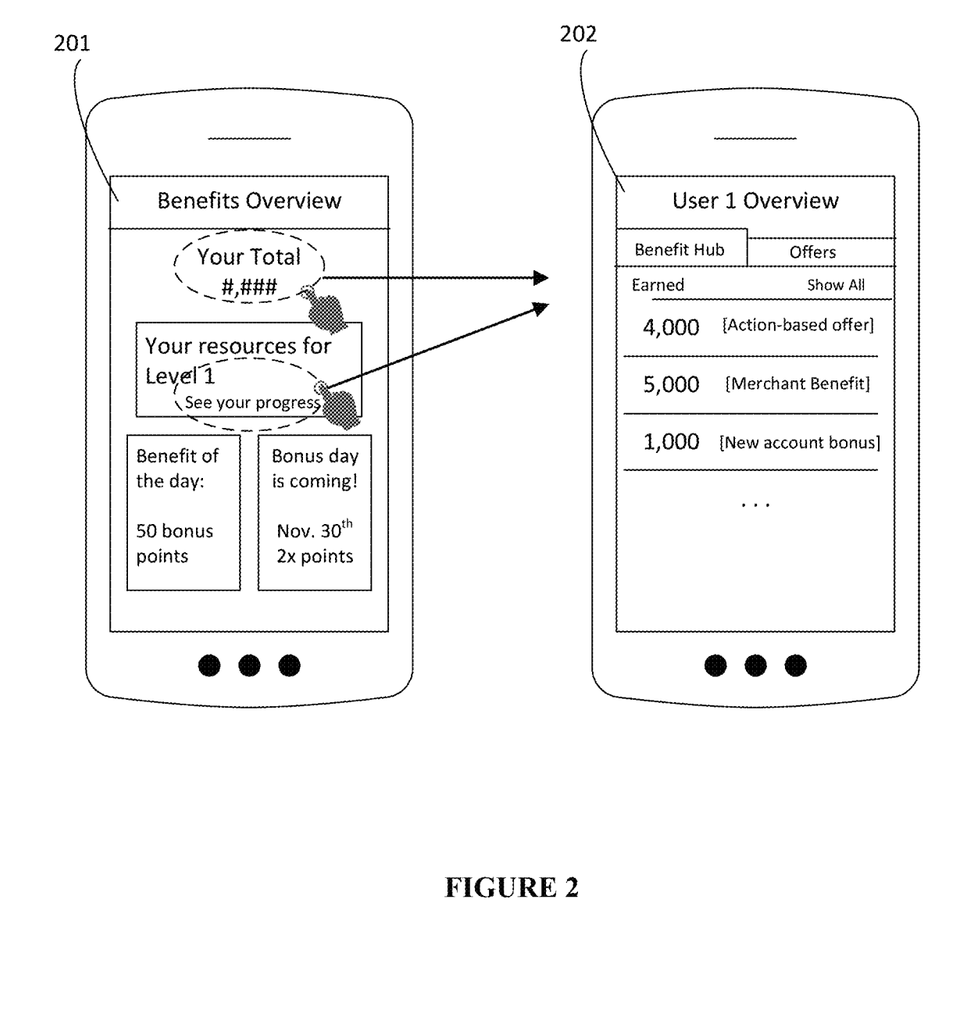
FIG. 2 illustrates exemplary embodiments of graphical user interfaces for systems and methods for combined processing of disparate resource types, in accordance with an embodiment of the disclosure.

FIG. 2 illustrates exemplary embodiments of graphical user interfaces for systems and methods for combined processing of disparate resource types, in accordance with an embodiment of the disclosure. As shown in FIG. 2, the system may generate multiple platform dashboard pages for display via the graphical user interface of an end-point device 140. It is understood that the invention may include many other platform dashboard pages for display via the graphical user interface of the end-point device 140, and that those provided in FIG. 2 are for exemplary purposes only. As indicated by display 201, the platform dashboard may include an overview page displayed immediately after the user logs into an entity mobile application, navigates to a specific section of an entity application, or navigates to a web-based portal provided by the system. The display 201 may include display sections indicating a user level or tier associated with a total number of resources accrued, or the like, or a level or tier corresponding to disparate benefits. As shown in FIG. 2, display 201 includes a section where a total number of accrued resources may be displayed such that the user can see their total resources accrued from multiple different merchants, institutions, or by nature of the user completing certain milestones, user actions, or the like. For instance, the display 201 may include a total number of resources displayed toward the top of the platform dashboard landing page. Just below the total number of resources section, there is a section dedicated to showing the user's "level," wherein the level may comprise a tier associated with the total number of resources accrued. It is understood that the level or tier may be designed to indicate user's progress toward a specific goal, the amount of the time the user has been enrolled in a benefit program or may indicate further benefits that the user may obtain (e.g., level 2 may allow the user to accrue two times the number of resources for a specific user action as compared to level 1, or the like).

As further shown on display 201 of FIG. 2, the initial landing page may include other information tailored to the user. For instance, this may include a dynamic "benefit of the day" wherein the user can claim a certain number of resources for logging into the platform. In other embodiments, the information tailored to the user may include a specific time period in which resource accrual will be multiplied, such as a "bonus day" (bonus period, or the like), set to a specific day of the year, day of the week, or the like. In other embodiments, the information tailored to the user may be one or more resource accrual opportunities associates with one or more merchants, product types, service types, or the like, that the system may determine the user is interested in based on a resource activity history associated with their resource account (e.g., the user may have purchased a product from Merchant 1, Merchant 1 may be a partner of the entity managing the system, and the system may automatically display an offer to accrue resources in Amount X if they shop at Merchant 1 and activate the specific offer, or the like). It is understood that the system may be linked to one or more instruments or accounts of the user. For instance, the user may maintain multiple types of resource accounts or instruments via the managing entity of the system, or some resource processor partnered with the managing entity. In some instances, each of these resource accounts or instruments may have resource accrual programs associated with them that allow the user to accrue airline miles, points, discounts, dollars, or the like. It is understood that the present system may combine each of these accruals into a common resource type and display a total accrued resource value via the display of the end-point device 140.

As further indicated by FIG. 2, clicking, tapping, or otherwise interacting with certain sections of display 201 may prompt the system to transition the graphical user interface of end-point device 140 to display different information, such as display 202. To achieve this, the system utilizes event listeners embedded within the client-side code, typically written in JavaScript or a JavaScript framework like React.js or Vue.js. These event listeners are designed to detect user interactions such as clicks or taps on specific elements of the interface. It is understood that the action of clicking, tapping, or interacting with the display of end-point device 140 may also prompt a device engagement, interactive engagement feature, or re-engagement action, such as haptic feedback, a colorful animation, an auditory transmission(s), or the like, that the user may find pleasing.

Upon detecting a user interaction, the system sends a request to the server via AJAX (Asynchronous Javascript and XML) calls or utilizing a WebSocket connection for more dynamic, real-time interactions. The server, running on a Node.js or similar runtime environment, processes the request and determines the appropriate response, which could include triggering an animation using CSS3 or JavaScript animations libraries, playing auditory feedback through the Web Audio API, or activating haptic feedback via APIs available on the end-point device's operating system.

For haptic feedback, the system leverages the device's native capabilities, sending instructions that are interpreted by the device's hardware to generate physical sensations. This process may involve calling specific APIs provided by the device's operating system, such as the Vibration API in HTML5 for web applications, or platform-specific SDKs for native applications. It is understood that animations are crafted to not only attract attention but also to provide a visual cue of the interaction, enhancing the user's engagement with the application. These animations are dynamically loaded and executed in the user's browser, ensuring a seamless and integrated experience without the need for page reloads or navigation away from the current context.

For auditory feedback, the system employs the Web Audio API to generate sounds in response to user actions. This can range from simple chimes or notification sounds to more complex audio cues designed to enhance the immersive experience of the platform. The audio files are preloaded or streamed as needed, ensuring minimal delay in playback when triggered. The combination of these interactive engagement features serves to create a more engaging and responsive user experience, encouraging continued interaction with the platform and reinforcing positive user actions through immediate and tangible feedback.

As such, interacting with the display of the end-point device 140 may be encouraged by positive feedback in one or more fashions. As shown on display 202, the system may display a more detailed overview specific to the user, such as a list of all earned resources, earned amounts, and the ways in which the resources were earned. For instance, as shown in display 202, this may include 4,000 (or some other number) of resource points earned from an action-based offer (e.g., the user may earn points if activate biometric authentication for an existing account, reach a certain savings goal, or the like, such that the user is encouraged to conduct positive, helpful behavior with regard to their resource account). In other embodiments, as shown in display 202, this may include 5,000 (or some other number) of resource points earned via a merchant benefit (e.g., the user purchased a product, service, or the like, from a specific merchant partnered with the managing entity). In other embodiments, as shown in display 202, this may include 1,000 (or some other number) of resource points accrued by nature of opening a new account, adding an authorized party, or the like. In this way, the total number of resource points shown in display 201 may be broken down into a specific list of actions, resource transfers, or the like, which caused the user to accrue resource points. By allowing the user to easily visualize how, when, and where resource points are accrued, and at what rate, the user may be further encouraged to re-engage in particular resource actions or user behaviors which result in the most resource points being accrued.

As further indicated by display 202 of FIG. 2, the display may include an "offers" tab where the user can navigate to in order to see different offers for either accruing additional resources or spending the resources that they have already accrued. In this way, the user may not only visualize past resources accrued, but also discover new ways to accrue resources and spend those resources in a preferred manner. For instance, the user may wish to redeem resources for dollars, gift cards, airline miles, or the like. It is understood that the exchange rate for resources to some other denomination is preferably kept consistent regardless of how the resources is redeemed such that the user may easily visualize how the resource points are redeemed. In this way, the system may simplify the process of accruing resources across different merchants, accounts, resource processors, or the like.

Figure 3:
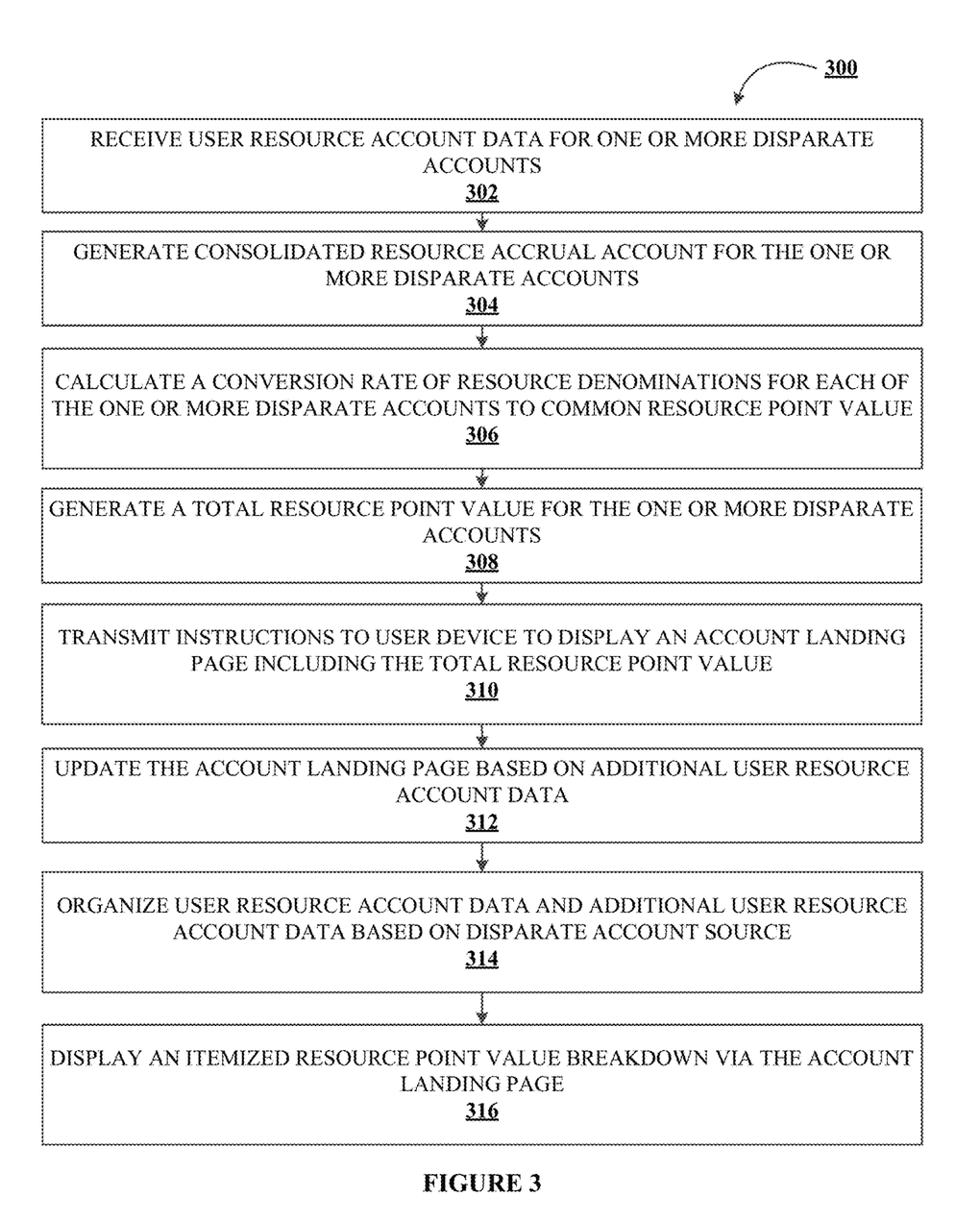
FIG. 3 illustrates a process flow for systems and methods for combined processing of disparate resource types, in accordance with an embodiment of the disclosure.

FIG. 3 illustrates a process flow for systems and methods for combined processing of disparate resource types, in accordance with an embodiment of the disclosure. As shown in block 302, the process begins whereby the system receives user resources account data for one or more disparate accounts. It is understood the disparate accounts refers to the fact that the user accounts may be managed by different entities, or may accrue resources from different entities (e.g., one or more rewards or loyalty accounts of disparate merchants, financial institutions, resource processors, card issuers, or the like). In it understood that, to facilitate this, the system utilizes API (Application Programming Interface) calls, designed in programming languages such as Python or Java, to fetch and standardize the incoming data from various entities. The use of JSON (JavaScript Object Notation) or XML (Xtensible Markup Language) formats enables efficient data interchange and standardization across different systems. This encompasses the reception of data relevant to user levels or tiers, which may affect the subsequent processing and presentation of rewards or benefits. Next, as shown in block 304 the system generates a consolidated resource accrual account for the one or more disparate accounts.

The system employs aggregation algorithms to combine the resource data from multiple sources, leveraging databases such as MySQL or MongoDB for storing consolidated account information. It is understood that MySQL is an open-source relational database management system (RDBMS) based on Structured Query Language (SQL). It is widely used for managing and organizing data in tables and allows users to handle data in a relational database using SQL queries. One of ordinary skill in the art will appreciate that MySQL is known for its reliability, scalability, and ease of use, and that it is commonly used in web applications and is a component of the LAMP web application software stack (Linux, Apache, MySQL, Perl/PHP/Python). One of ordinary skill in the art will also appreciate MongoDB is an open-source NoSQL ("non-SQL" or "non-relational database) that uses a document-oriented data model. Unlike traditional relational databases that store data in tables with fixed rows and columns, MongoDB stores data in flexible, JSON-like documents, meaning the data structure can vary from document to document. This model allows for the storage of complex hierarchies, arrays, and nested data, making it well-suited for handling large volumes of unstructured or semi-structured data.

Python libraries like Pandas are utilized for data manipulation, enabling the conversion of resources into a common resource point value through intelligent calculation of conversion rates. Utilizing aggregation algorithms and a robust database management system, the system combines resource data across accounts, applying conversion rates to normalize disparate resource denominations into a unified metric. During this step, the system also prepares to dynamically generate user-specific rewards based on the aggregated account data, further personalizing the user's experience. Machine learning algorithms, possibly utilizing libraries from Python's scikit-learn, analyze user interaction history and preferences to dynamically tailor rewards, supported by real-time data processing frameworks like Apache Kafka for immediate updates. In this way, the system requests access to the disparate resource accounts in order to at least view the accrued resource totals in the accounts. Secure data transmission protocols, such as HTTPS (Hypertext Transfer Protocol Secure) and OAuth (Open Authorization), ensure the protected exchange of data between the system and external sources. In some embodiments, the system is also given permission by the disparate merchants or entities to request transfer of accrued resources from the disparate accounts to the consolidated resource accrual account. It is understood that in some embodiments, secure and verifiable resource transfers, technologies like blockchain or smart contracts may be employed, ensuring transparency and security in the transfer process.

Next, as shown in block 306, the system may calculate a conversion rate of resource denominations for each of the one or more disparate accounts to a common resource point value. It is understood that this calculation might employ algorithms written in Python or Java, which are capable of handling complex data sets and performing mathematical operations efficiently. In some embodiments, the system may utilize a modular architecture where each module is responsible for fetching the current conversion rates from an external API or a database that stores historical conversion rate data, ensuring accuracy in real-time conversions. For instance, the system may determine, intelligently, based on redemption options of each disparate resource account, an approximate dollar value for resources in each of the respective disparate accounts. To do this, the system may apply machine learning models to predict the best possible conversion rates based on historical redemption patterns, leveraging Python's scikit-learn or TensorFlow for predictive analytics. Using this conversion rate, the system may generate a total resource point value for the one or more disparate accounts, as shown in block 308.

For instance, resources from Account 1 may have a conversion rate of 1 point to 1 dollar, while resources from Account 2 have a conversion rate of 2 points to 1 one dollar. In that instance, the system may convert all points to their dollar value before then converting to a consolidated resource accrual point value. In some embodiments, for the conversion process, the system may utilize a centralized database, such as PostgreSQL, to store and manage these conversion rates and perform the necessary calculations. In some embodiments, the database may be designed to handle high-volume transactions to ensure scalability and performance. This process underpins the generation of an interactive, engaging user experience by tailoring the presentation of rewards and account information on the landing page based on these conversions. The consolidated resource accrual point value may be any number set by the managing entity to signify resource points accrued in the consolidated resource accrual account. Additionally, the system could employ RESTful API (Representational State Transfer API) services to dynamically update the conversion rates and the total resource point values on the user's account landing page, using web technologies like JavaScript, AJAX (Asynchronous JavaScript and XML), or web sockets for a seamless user experience. For instance, the managing entity may determine that 1 dollar is equal to 100 consolidated resource accrual points, and therefore award 100 resource points to the consolidated resource accrual account for every dollar value accounted for in the one or more disparate resource accounts.

As further shown in block 310, the system may transmit instructions to a user device to display an account landing page including the total resource point value in the consolidated resource accrual account. This process involves the use of web development frameworks to create dynamic, responsive user interfaces that can display complex information in an accessible format. Data is sent from the server using JSON format over RESTful APIs, allowing for the efficient transmission of data between the server and the client application. This includes dynamically updating user levels or tiers based on the calculated total resource point value and presenting options for navigating to an offers tab. As shown in FIG. 2, this may include a total amount of resources displayed for a user as they log in to a mobile application, web portal, or the like. The landing page also features interactive engagement elements, such as haptic feedback or animations, triggered by user interactions. These interactive features may be implemented using JavaScript libraries for animations or the web audio API for auditory feedback, enhancing user engagement through sensory stimuli.

It is understood that the system may update the account landing page in real-time based on additional user resource account data received by the system indicated a fluctuation in resources in any of the one or more disparate resource accounts, as indicated by block 312. If the user wishes to see a breakdown of points earned, how they were earned, and the source of the points, the user may be shown a list of resource account data organized based on disparate account source, as shown in block 314 and as indicated by display 201 of FIG. 2. This list includes an itemized resource point value breakdown, detailing the actions or promotions that led to point accrual, emphasizing the system's capability to provide a comprehensive and detailed account management experience.

Finally, the system may also display an itemized resource point value breakdown via the account landing page. In this way, the user may view a list of not only each source of the resources accrued, but also the specific user action, resource action, behavior, promotion, or the like, along with a corresponding specific point value.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for combined processing of disparate resource types, the system comprising:
    at least one non-transitory storage device; and
    at least one processor coupled to the at least one non-transitory storage device, wherein the at least one processor is configured to:
    receive user resource account data for one or more disparate accounts;
    generate a consolidated resource accrual account for the one or more disparate accounts;
    calculate a conversion rate of resource denominations for each of the one or more disparate accounts to a common resource point value;
    generate a total resource point value for the one or more disparate accounts;
    transmit instructions to a user device to display an account landing page comprising the total resource point value;
    provide an interactive engagement feature via the user device comprising haptic feedback in response to a user interaction with the account landing page;
    update the account landing page based on additional user resource account data;
    organize user resource account data and additional user resource account data based on disparate account source; and
    display an itemized resource point value breakdown via the account landing page.

2. The system of claim 1, wherein the account landing page further comprises a display section indicating a user level or tier associated with a total number of resources accrued, wherein each level or tier corresponds to disparate benefits.

3. The system of claim 1, wherein the system is further configured to: generate dynamic user-specific rewards on the account landing page comprising at least one of a benefit of the day, a bonus period during which resource accrual is multiplied, or personalized resource accrual opportunities based on a user resource activity history.

4. The system of claim 1, wherein the interactive engagement feature further comprises at least one of an animation or auditory transmissions, and wherein the system is further configured to, when providing the interactive engagement feature:
    detect the user interaction with the landing page; and
    send a request comprising instructions to generate a physical sensation to the user device.

5. The system of claim 1, wherein the system is further configured to: allow the user to navigate to an offers tab on the account landing page to view options for accruing additional resources or spending accrued resources, wherein the options include redeeming resources for at least one of dollars, gift cards, or airline miles.

6. The system of claim 1, wherein the system is further configured to: update the display of the total resource point value in real-time based on fluctuations in resources within the one or more disparate accounts; and
    display a breakdown of points earned, wherein the breakdown comprises a source of the points earned, a specific user action related to the point earned, or a promotion related to the points earned.

7. The system of claim 1, wherein the system is further configured to: initiate a transfer of accrued resources from the one or more disparate accounts to the consolidated resource accrual account upon receiving permission from entities managing the disparate accounts.

8. A computer program product for combined processing of disparate resource types, the computer program product comprising a non-transitory computer-readable medium comprising code causing an apparatus to:
    receive user resource account data for one or more disparate accounts;
    generate a consolidated resource accrual account for the one or more disparate accounts;
    calculate a conversion rate of resource denominations for each of the one or more disparate accounts to a common resource point value;
    generate a total resource point value for the one or more disparate accounts;
    transmit instructions to a user device to display an account landing page comprising the total resource point value;
    provide an interactive engagement feature via the user device comprising haptic feedback in response to a user interaction with the account landing page;
    update the account landing page based on additional user resource account data;
    organize user resource account data and additional user resource account data based on disparate account source; and
    display an itemized resource point value breakdown via the account landing page.

9. The computer program product of claim 8, wherein the account landing page further comprises a display section indicating a user level or tier associated with a total number of resources accrued, wherein each level or tier corresponds to disparate benefits.

10. The computer program product of claim 8, wherein the code further causes the apparatus to: generate dynamic user-specific rewards on the account landing page comprising at least one of a benefit of the day, a bonus period during which resource accrual is multiplied, or personalized resource accrual opportunities based on a user resource activity history.

11. The computer program product of claim 8, wherein the interactive engagement feature further comprises at least one of an animation or auditory transmissions, and wherein the code further causes the apparatus to, when providing the interactive engagement feature:

detect the user interaction with the landing page; and send a request comprising instructions to generate a physical sensation to the user device.

12. The computer program product of claim 8, wherein the code further causes the apparatus to: allow the user to navigate to an offers tab on the account landing page to view options for accruing additional resources or spending accrued resources, wherein the options include redeeming resources for at least one of dollars, gift cards, or airline miles.

13. The computer program product of claim 8, wherein the code further causes the apparatus to: update the display of the total resource point value in real-time based on fluctuations in resources within the one or more disparate accounts; and display a breakdown of points earned, wherein the breakdown comprises a source of the points earned, a specific user action related to the point earned, or a promotion related to the points earned.

14. The computer program product of claim 8, wherein the code further causes the apparatus to: initiate a transfer of accrued resources from the one or more disparate accounts to the consolidated resource accrual account upon receiving permission from entities managing the disparate accounts.

15. A method for combined processing of disparate resource types, the method comprising:

receiving user resource account data for one or more disparate accounts;

generating a consolidated resource accrual account for the one or more disparate accounts;

calculating a conversion rate of resource denominations for each of the one or more disparate accounts to a common resource point value;

generating a total resource point value for the one or more disparate accounts;

transmitting instructions to a user device to display an account landing page comprising the total resource point value;

providing an interactive engagement feature via the user device haptic feedback in response to a user interaction with the account landing page;

updating the account landing page based on additional user resource account data;

organizing user resource account data and additional user resource account data based on disparate account source; and displaying an itemized resource point value breakdown via the account landing page.

16. The method of claim 15, wherein the account landing page further comprises a display section indicating a user level or tier associated with a total number of resources accrued, wherein each level or tier corresponds to disparate benefits.

17. The method of claim 15, wherein the method further comprises: generating dynamic user-specific rewards on the account landing page comprising at least one of a benefit of the day, a bonus period during which resource accrual is multiplied, or personalized resource accrual opportunities based on a user resource activity history.

18. The method of claim 15, wherein the interactive engagement feature further comprises at least one of an animation or auditory transmissions, and wherein the method further comprises, when providing the interactive engagement feature:

detecting the user interaction with the landing page; and sending a request comprising instructions to generate a physical sensation to the user device.

19. The method of claim 15, wherein the method further comprises: allowing the user to navigate to an offers tab on the account landing page to view options for accruing additional resources or spending accrued resources, wherein the options include redeeming resources for at least one of dollars, gift cards, or airline miles.

20. The method of claim 15, wherein the method further comprises: updating the display of the total resource point value in real-time based on fluctuations in resources within the one or more disparate accounts; and displaying a breakdown of points earned, wherein the breakdown comprises a source of the points earned, a specific user action related to the point earned, or a promotion related to the points earned.

* * * * *